April 7, 1970 — A. C. LEENHOUTS ET AL — 3,505,579
POWER SUPPLY FOR A STEPPING MOTOR
Filed Jan. 5, 1968
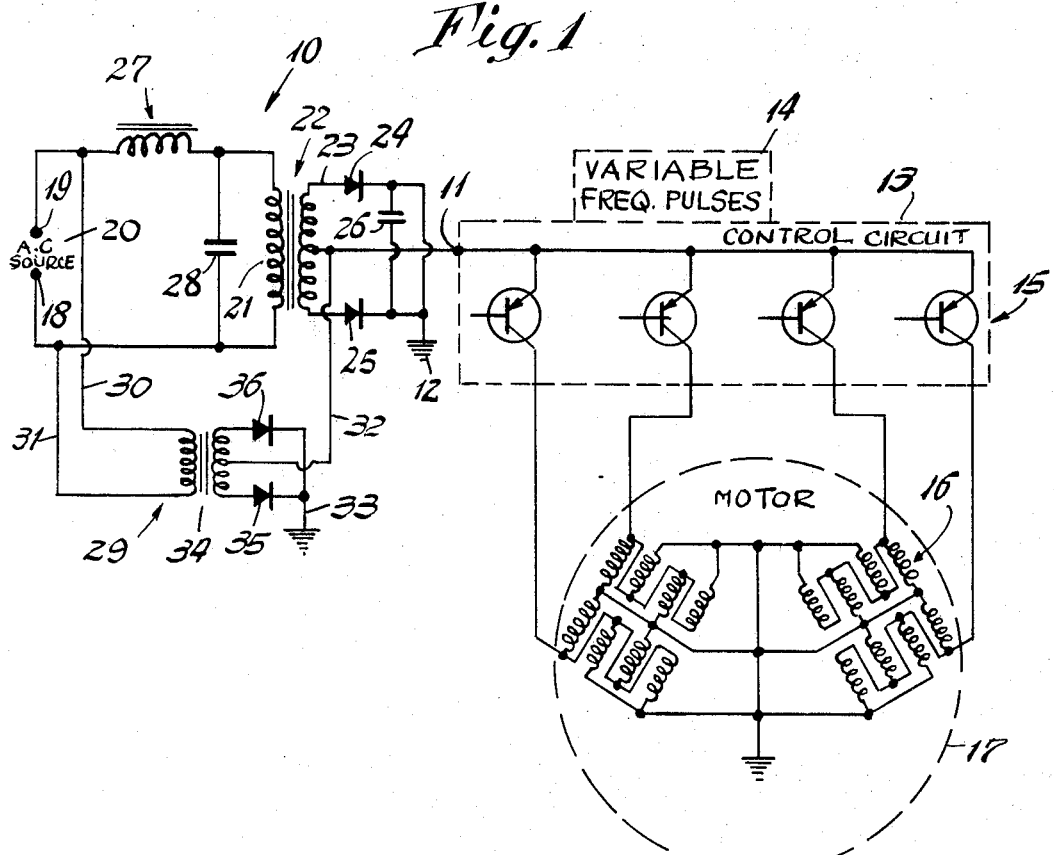
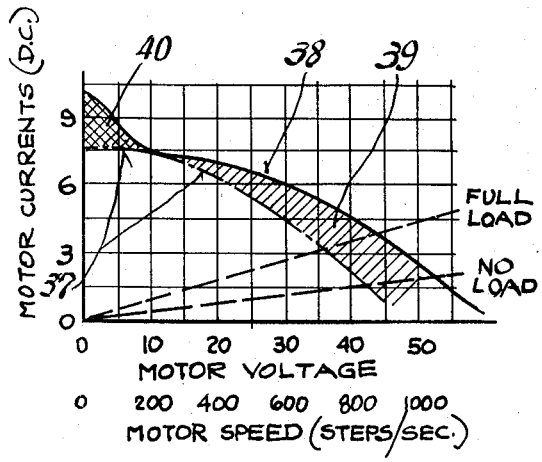
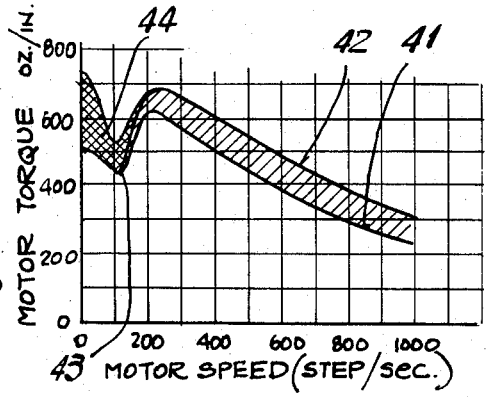
INVENTORS
Albert C. Leenhouts
William M. France
Joseph C. May
BY Johnson and Kline
ATTORNEYS United States Patent Office 3,505,579
Patented Apr. 7, 1970

3,505,579
POWER SUPPLY FOR A STEPPING MOTOR
Albert C. Leenhouts, Granby, William M. France, Unionville, and Joseph C. May, Cheshire, Conn., assignors to The Superior Electric Company, Bristol, Conn., a corporation of Connecticut
Filed Jan. 5, 1968, Ser. No. 696,077
Int. Cl. H02k 29/00
U.S. Cl. 318—138                    5 Claims

ABSTRACT OF THE DISCLOSURE

A power circuit for supplying power from an A.C. source to a D.C. energized digital or stepping motor to increase the torque of the motor by adjusting the value of the voltage to the motor substantially inversely to the value of the current drawn by the motor at its higher speeds and providing a substantially constant voltage at the low stepping speeds with the speed of the motor being regulated by a control circuit to be independent of the voltage applied thereto.

---

In U.S. Patent No. 3,117,268, assigned to the assignee of the present invention, there is disclosed a control circuit that is utilized with an electric motor of the stepping type. The motor has stator windings and when some of the windings have their energization changed, the motor will produce a small increment of movement of its rotor. By changing, in a particular sequence, the windings which are energized, the motor may be made to rotate at a speed determined solely by the frequency of the changes of energization. The control circuit accepts command pulses and translates them into a change of energization according to the sequence for each pulse received and thus by merely varying the frequency or rate of the pulses, the speed of the motor may be changed. In the absence of a pulse or between slow pulses, the rotor is held stationary at the position effected by the last change of energization, the said energization being maintained.

While the above-noted control circuit has been found to operate satisfactorily, it was noted that energizing the windings with a constant value of unidirectional voltage as disclosed therein, tended to produce a torque that not only was not relatively uniform over a speed range but also the range was quite narrow. This was found to be attributable to the motor not having sufficient voltage applied thereto at its higher stepping speeds, while holding the voltage at its lower level to a tolerable value.

To obviate the varying torque and increase the speed range, there is disclosed in a pending United States application, Ser. No. 670,951, filed Sept. 27, 1967, and assigned to the assignee of the present invention, a power control circuit which adjusts the voltage across the motor somewhat proportionally to the speed of the motor. The circuit was dependent on the discovery that the current flow was essentially an inverse function of the motor speed and as such could be utilized with passive components to vary the voltage across the motor.

While this power circuit has been found satisfactory in many instances, it has been noted that at very low speeds, i.e. on the order of less than 100 steps per second and at high speeds on the order of 800 to 1000 steps per second, the torque produced by the motor still varied from the intermediate speed range torque. Moreover, each motor usually has a low stepping speed at which it tends to be in resonance which effects a decrease in its torque at that one speed. Thus while the circuit disclosed in the above-noted patent application materially uniformized the torque, the latter has not been found to be completely satisfactory to provide a torque which is both above a minimum value and somewhat uniform within a wide speed range.

It is accordingly an object of the present invention to provide an improved power control circuit for a stepping motor which produces a relatively uniform torque throughout a wide range of speeds of the motor and with the torque at any speed within the range being above a minimum value.

Another object of the present invention is to provide a power circuit which not only is instantaneously reactive to a chnage in motor speed to change the motor voltage to that required at each speed but is sufficiently instantaneously reactive to provide the small voltage values required at the stop positions of the motor as when braked or between slow steps.

A further object of the present invention is to provide a power circuit for a stepping motor of the above type which is composed of extremely simple and passive components that not only have a long life but also may be economically associated with the control circuit with few or no alterations of the control circuit.

In carrying out the present invention, the power supply for a stepping motor is utilized with the control circuit and the stepping motor as disclosed in the above-noted patent. As taught therein, the control circuit accepts command pulses from a variable frequency source, such as an oscillator, and utilizes the pulses through its output to provide a change in energization of some of the windings of the motor. For each pulse, the motor will move one increment and hence its speed is determined solely by the frequency of the pulses. The power to the windings that is controlled by the control circuit is a unidirectional or D.C. voltage and as taught in the above-noted application may be obtained from a power supply that is connectible to an A.C. source. The power supply includes rectifying means having output terminals that are connected to the control circuit so that the power to the motor windings consists of rectified current.

The power supply of the present invention includes essentially the same circuit as disclosed in the above-noted application and thus has an inductance means that is positioned in the A.C. part of the power circuit. As the inductance means will change its value of voltage drop with the value of current flow therethrough, use is made thereof to increase the value of the voltage output of the power supply at higher stepping speeds while decreasing the value of the voltage at lower stepping speeds. This is achieved essentially by the constant impedance inductance means providing a voltage drop that varies with the current flow through the motor and hence as the motor operates at the higher speeds, it draws less current which decreases the voltage drop of the inductance means in the power supply circuit and thus decreases the difference between the values of the A.C. source voltage and the power supply output voltage.

The torque of the motor is somewhat related to the current flow through its windings and the latter is dependent upon essentially the applied voltage across its windings and the impedance of the windings. It has been found that only an inductance means in the power supply does not provide sufficient voltage at the higher stepping speeds to overcome the increase in winding impedance with speed and thus have the required current flow that provides the torque which the motor is capable of producing. The present invention partially minimizes the voltage drop of the inductance means at the higher stepping speeds by the inclusion of a capacitance in the A.C. power side of the power means and it serves to decrease the total impedance of the power circuit at lower values of current flow without however detracting from the inductance means control of the voltage at the higher value of current flow required for the intermediate stepping speeds.

In addition to the inductance means and capacitance in the power supply, it has been found that at lower stepping speeds, the torque produced by the motor may be increased and any resonance characteristics of the motor somewhat overcome by inclusion of other voltage circuit which provides a voltage to the control circuit which is substantially constant in value. Thus the power supply of the present invention includes a first circuit that produces a voltage that is variable with the current drawn by the motor and a second circuit that produces a substantially constant value of the voltage. The latter voltage is of a lower magnitude so that at the low speeds the motor has impressed thereacross the substantially constant voltage while at its higher speed its voltage would vary with the speed as the voltage of the variable circuit increases beyond that of the constant voltage circuit.

Other features and advantages will hereinafter appear.

In the drawing:

FIGURE 1 is a schematic diagram of a power circuit for a stepping motor of the present invention.

FIG. 2 is a graph of some of the motor characteristics when a heretofore known power supply circuit is used as compared to the power supply circuit of the present invention.

FIG. 3 is a graph of the output torque versus motor speed where a heretofore known power supply is used as compared to the power supply of the present invention.

Referring to the drawing, the power supply of the present invention is generally indicated by the reference numeral 10 and is shown having a pair of output terminals 11 and 12 that are connected to a control circuit 13. The control circuit accepts pulses from a variable frequency pulse source 14 and through transistors 15 energizes windings 16 of a stepping motor 17. The control circuit, motor and variable frequency pulses are shown enclosed within dotted lines and their description of operation is set forth in the above-noted patent. Moreover, it will be understood that the sole power to the motor windings 16 is obtained from the power supply 10 and its distribution among the windings is controlled by the transistors 15 such that for one state of energization of the windings, some of the windings are energized by their respective transistors conducting while for a change in energization, some of the transistors shift their state to render other windings energized. Thus the motor will have a speed determined solely by the frequency of the changes in energization which as disclosed in said patent may be at a 1:1 ratio with the pulses supplied from the variable frequency pulse source 14.

The power supply has a pair of input terminals 18 and 19 connected to an A.C. source 20 such as the conventional 60 cycle per second supply at the usual commercial voltages. The input terminals are connected by leads to the ends of a primary winding 21 of a transformer 22 having a center tapped secondary winding 23. A pair of diodes 24 and 25 are connected to the ends of the winding 23 and to the output terminal 12 while the center tap is connected to the other output terminal 11. If desired a filtering means may be included, such as condenser 26. It will be understood that the A.C. from the source is thus rectified into unidirectional current at the output terminals 11 and 12.

As disclosed in the above-noted pending application, there is provided an inductance means 27 connected in series between the A.C. source 20 and the primary winding 21 so that the voltage across the primary winding 21 is the difference between the voltage of the A.C. source less the voltage drop produced by the inductance means. As the voltage drop is essentially proportional to the current flow, the primary winding voltage thus is varied essentially inversely with the value of the current flow through the inductance means 27. The A.C. frequency remains constant and as the inductance means 27 is not operated at its saturation point, it functions essentially as a linear impedance.

In accordance with the present invention, the effective impedance of inductance means 27 is decreased at lower values of current flow into transformer 21 by the capacitance means 28 being connected across the input to transformer 21. As the current flow to transformer 21 is decreased in magnitude, the effective capacitive susceptance of the combined capacitance means 28 and transformer 21 is increased in magnitude. This capacitive susceptance, being of opposite sign of the inductive susceptance of inductance means 27, cancels a portion of the inductive susceptance. Thus the equivalent impedance presented to the A.C. source is decreased, and a larger current flows through inductance means 27, resulting in a larger voltage across the input to transformer 21 than would be present without capacitance means 28.

The inductance means 27 and capacitor 28 form a part of a first power supply circuit which accordingly produces a variable voltage to the control circuit 13 that is inversely related to the current flow through the motor. A second circuit, generally indicated by the reference numeral 29, is also a constituent of the power supply and has a pair of leads 30 and 31 connected to the A.C. source 20 and a pair of output leads 32 and 33. Interconnected between the input and output leads is a transformer 34 and diodes 35 for providing in the leads 32 and 33 a unidirectional current. The latter leads are functionally connected to the output terminals 11 and 12 respectively of the power supply so that the voltage produced by the second circuit 29 is also applied to the control circuit.

The second circuit, as will be hereinafter more fully set forth, is utilized to produce a higher torque on the motor at the lower stepping speeds while the variable voltage first circuit that includes the inductance means 27 and capacitance 28 provides for control of the voltage for the higher range of stepping speeds. As a relative comparison, the second circuit 29 may be set to produce a continuous maximum output of 5 volts while the maximum output of the variable circuit may be on the order of 50 volts with the transformers providing the necessary ratios between their output voltages and the A.C. source voltage.

Referring to FIG. 2, there is shown a graph in which the current through the motor 17 is set forth on the ordinate while the voltage across the motor or motor voltage drop is indicated on the abscissa. Additionally on the abscissa there is further included the motor speed with the range being from zero to 1000 steps per second. The motor voltage and the motor speed are generally not exactly linear but essentially so and thus as the motor speed increases the voltage drop across the motor increases by reason of the impedance of the stator windings increasing due substantially completely to the increase in the rate of changes of energization increasing the inductance thereof by the usual impedance formula of $V = 2\pi FL$ where F is the frequency of the changes of energization or motor speed. The motor tends to produce a counter EMF but the voltages induced are essentially reactive to the applied unidirectional current and thus do not serve to provide any substantial limitation on the current flow through the motor, they being extremely minor as compared to the change of impedance of the inductance of the stator windings with speed.

The dot-dash curve indicated by the reference numeral 37 is a typical curve of the motor current and motor voltage when the power supply includes just the inductance means 27 as disclosed and claimed in the above-noted U.S. pending application. The power supply of the present invention produces the solid curve 38 which shows that at the higher stepping speeds there is a susbtantial increase in motor current, with the increase being shown by the area that is marked with diagonal lines 39. Thus at the higher stepping speeds, the power supply of the present invention produces a higher voltage across the motor with are increased current flow than in the heretofore known power supply circuits.

The lower stepping range of the motor has a lower voltage impressed across the motor and the leftward portion of the line 37 indicates the motor voltage when the power supply is as that shown in the said U.S. patent application. The power supply of the present invention is also shown by the corresponding leftward portion of the line 38 and the difference between the two is depicted by the cross-hatched area 40.

The effect of the motor and voltages shown in FIG. 2 on the torque of the motor as compared to its speed is depicted on the graph shown in FIG. 3. The capability of the motor is usually determined by its lowest output torque within a selected speed range of, for example, zero to 1000 steps per second. While it may seem preferred to have an exactly uniform torque over the whole speed range, it has been found however that in many applications, as for example, if the motor is utilized to drive a load at low stepping speeds or to be braked, that higher torque is desired or needed. The curve indicated by the reference numeral 41 depicts the characteristics of the motor when the power supply is as that disclosed in the above-noted application while the curve 42 depicts the characteristics of the same motor when the power supply of the present invention is employed.

It will be appreciated that at higher stepping speeds, there is a substantial increase in torque which is denoted by the area that has diagonal lines. As a specific example, the mere addition of the condenser 28 to the power supply has produced a torque increase of about 30%, i.e. 80 oz. inches (270 oz. inches vs. 350 oz. inches) at the motor speed of 1000 steps per second. Moreover, even at an intermediate stepping speed, as for example 300 steps per second, an increase in torque of about 20% has been achieved by the use of the present invention.

With respect to the lower stepping speeds, both torque curves 42 and 43 generally have a dip, indicated by the reference numeral 43 which indicates a decrease in torque at a particular speed, generally around 100 steps per second. At present it is believed that one factor attributing to the dip is the motor and load resonating. Further leftwardly of the dip at stepping speeds of less than 100 steps per second, the constant voltage second circuit produces an increase in torque indicated by the crosshatched portion 44. As a specific example of the increase in torque at the stepping speed of 30 steps per second, the power circuit of the present invention has increased the torque by about 35% (510 oz. inches vs. 710 oz. inches) over that heretofore effected by a known power supply.

It will accordingly be understood that there has been disclosed a power supply for use with a stepping motor which enables the motor to have a generally higher, more uniform torque over a wider speed range than that effected by heretofore known power supplies. The stepping motor has its speed controlled by a control circuit and the power supply is instantaneously reactive to changes in speed by being made responsive to the current flow through the motor at other than the lower stepping speeds. For the latter, the power supply produces an essentially constant voltage which becomes effective only for relatively large values of current flow.

Variations and modifications may be made within the scope of the claims and portions of the improvements may be used without others.

We claim:

1. In combination with a digital stepping motor of the type having stator windings that produce an incremental movement for each change of energization of at least some of the windings by unidirectional current, a control circuit having an output connected to the windings to provide a change of energization upon receipt of a command pulse, command pulse supplying means for providing command pulses at a rate that determines the operating speed of the motor with the rate being variable from none to a relatively high value, and a power circuit having input terminals connectible to an A.C. source and including rectifying means having output terminals connected to the control circuit to provide the unidirectional output power that the control circuit supplies to the stator windings, the improvement comprising a first circuit in the power means having means for providing a voltage to the output terminals of the power circuit that varies substantially inversely with the value of current flow through the windings and a second power circuit in the power means for providing a substantially constant voltage to the output terminals.

2. The invention as defined in claim 1 in which the means in the first circuit is positioned between the input terminals of the power means and the rectifying means.

3. The invention as defined in claim 1 in which the value of the substantially constant voltage is substantially less than the normal values of the voltage of the first circuit and provides a constant voltage to the windings for low operating speeds.

4. The invention as defined in claim 2 in which the means for varying the voltage includes an inductance means connected in series with an input terminal and a capacitance means connected in parallel with the input to the rectifying means.

5. The invention as defined in claim 1 in which the first circuit provides a voltage which is less than the voltage provided by the second circuit to the control circuit only at low stepping speeds.

References Cited

UNITED STATES PATENTS 3,355,646  11/1967  Goto _____ 318—138
3,209,224  9/1965   Guinard _____ 318—138

GLEN SIMMONS, Primary Examiner

U.S. Cl. X.R.

318—430, 440, 442, 504